US011874957B2

(12) United States Patent
Salisbury et al.

(10) Patent No.: US 11,874,957 B2
(45) Date of Patent: Jan. 16, 2024

(54) AUGMENTED REALITY SYSTEM

(71) Applicant: Thermoteknix Systems Limited, Cambridge (GB)

(72) Inventors: Richard S. Salisbury, Cambridge (GB); Thomas Oldbury, Cambridge (GB)

(73) Assignee: Thermoteknix Systems Ltd., Cambridge (GB)

( * ) Notice: Subject to any disclaimer, the term of this patent is extended or adjusted under 35 U.S.C. 154(b) by 0 days.

(21) Appl. No.: 17/843,185

(22) Filed: Jun. 17, 2022

(65) Prior Publication Data
US 2022/0413601 A1 Dec. 29, 2022

(30) Foreign Application Priority Data

Jun. 25, 2021 (GB) .................................. 2109202

(51) Int. Cl.
*G06F 3/01* (2006.01)
*G06F 3/0346* (2013.01)

(52) U.S. Cl.
CPC .......... *G06F 3/012* (2013.01); *G06F 3/0346* (2013.01)

(58) Field of Classification Search
CPC ...... G06F 3/012; G06F 3/0346; G06F 1/1694; G06F 3/011; G06F 1/163; G06F 1/16; G06F 3/01
See application file for complete search history.

(56) References Cited

U.S. PATENT DOCUMENTS

| 5,164,707 | A  | * | 11/1992 | Rasmussen | ............ | G08B 21/18 |
|           |    |   |         |           |              | 250/221    |
| 9,618,747 | B2 | * | 4/2017  | Villmer   | .................. | G06T 11/60 |
| 10,030,931| B1 | * | 7/2018  | Black     | ...................... | F41A 33/00 |
| 2007/0273583 | A1 | * | 11/2007 | Rosenberg | .............. | H04L 67/14 |
|           |    |   |         |           |              | 342/367    |
| 2008/0318681 | A1 | * | 12/2008 | Rofougaran | ............ | G01S 7/412 |
|           |    |   |         |           |              | 463/39     |

(Continued)

FOREIGN PATENT DOCUMENTS

WO 2013049248 A2 4/2013

OTHER PUBLICATIONS

IPO search report dated Apr. 11, 2022, in connection with GB2109202.8 filed on Jun. 25, 2021.

*Primary Examiner* — Benyam Ketema
(74) *Attorney, Agent, or Firm* — Downs Rachlin Martin PLLC

(57) ABSTRACT

An augmented reality (AR) system that includes a viewing device and a power pack linked to the viewing device, with the power pack including a primary orientation sensor, an orientation engine, and an AR engine. In some embodiments, the primary orientation sensor is operable to measure orientation of the power pack, the orientation engine is operable to calculate an orientation of the viewing device based on a relationship between the power pack and the viewing device, and the AR engine is operable to generate AR data that varies in response to the calculated viewing device orientation and to determine or update the relationship between orientations of the power pack and the viewing device, for example, by polling a secondary orientation sensor in the viewing device. Other embodiments, related power packs, and methods are also disclosed.

24 Claims, 6 Drawing Sheets

(56) References Cited

U.S. PATENT DOCUMENTS

| | | | |
|---|---|---|---|
| 2011/0214082 A1* | 9/2011 | Osterhout | G02B 27/017 715/773 |
| 2011/0225536 A1* | 9/2011 | Shams | H04N 23/55 715/773 |
| 2012/0194420 A1* | 8/2012 | Osterhout | G06F 3/013 345/156 |
| 2013/0083007 A1* | 4/2013 | Geisner | G06T 19/006 345/419 |
| 2013/0083018 A1* | 4/2013 | Geisner | G06F 3/011 345/633 |
| 2013/0083062 A1* | 4/2013 | Geisner | G02B 27/017 345/633 |
| 2013/0169682 A1* | 7/2013 | Novak | G06Q 10/1095 345/633 |
| 2013/0174213 A1* | 7/2013 | Liu | G06F 21/6245 726/1 |
| 2013/0176192 A1* | 7/2013 | Varga | G06T 15/40 345/7 |
| 2013/0181892 A1* | 7/2013 | Liimatainen | G06F 3/013 345/156 |
| 2013/0208014 A1* | 8/2013 | Fleck | G06V 20/35 345/672 |
| 2013/0282345 A1* | 10/2013 | McCulloch | G06F 3/0304 703/6 |
| 2013/0307855 A1* | 11/2013 | Lamb | G06F 3/013 345/473 |
| 2015/0029218 A1* | 1/2015 | Williams | G02B 27/0172 345/633 |
| 2015/0310665 A1* | 10/2015 | Michail | G06F 3/013 345/419 |
| 2016/0042432 A1* | 2/2016 | Wenig | G06F 16/00 705/26.7 |
| 2016/0259404 A1* | 9/2016 | Woods | G06T 19/006 |
| 2017/0045736 A1* | 2/2017 | Fu | G02B 27/017 |
| 2017/0205903 A1* | 7/2017 | Miller | G06T 7/174 |
| 2017/0336641 A1* | 11/2017 | von und zu Liechtenstein | G06T 19/006 |
| 2018/0088185 A1* | 3/2018 | Woods | G06F 3/0304 |
| 2018/0088323 A1* | 3/2018 | Bao | G02B 27/017 |
| 2018/0092698 A1* | 4/2018 | Chopra | A61B 90/39 |
| 2018/0096531 A1* | 4/2018 | Greenhalgh | H04L 63/0861 |
| 2018/0239144 A1* | 8/2018 | Woods | A63F 13/213 |
| 2019/0004325 A1* | 1/2019 | Connor | G02B 27/0172 |
| 2019/0242952 A1* | 8/2019 | Schneider | G06F 3/012 |
| 2019/0392779 A1 | 12/2019 | Sahin | |
| 2020/0027275 A1* | 1/2020 | Wan | G06V 10/82 |
| 2020/0033602 A1* | 1/2020 | Nocon | G02B 27/0172 |
| 2020/0096575 A1* | 3/2020 | Woods | G06F 1/163 |
| 2021/0072821 A1* | 3/2021 | von und zu Liechtenstein | G06F 3/012 |
| 2021/0103146 A1* | 4/2021 | Travers | G02B 6/0076 |
| 2021/0217210 A1* | 7/2021 | Gade | G06F 3/012 |
| 2021/0241636 A1* | 8/2021 | Yu | B64U 10/60 |
| 2021/0263592 A1* | 8/2021 | Chang | G06T 7/70 |
| 2022/0354593 A1* | 11/2022 | Poltaretskyi | A61B 17/848 |
| 2022/0413601 A1* | 12/2022 | Salisbury | G06F 1/163 |
| 2023/0168736 A1* | 6/2023 | Rottler | A63F 13/428 345/156 |

* cited by examiner

AUGMENTED REALITY SYSTEM

RELATED APPLICATION DATA

This application claims the benefit of priority of Great Britain Patent Application Serial No. GB 2109202.8, filed Jun. 25, 2021, and titled Augmented Reality System, which is incorporated by reference herein in its entirety.

FIELD OF THE DISCLOSURE

The present invention relates to augmented reality systems. In particular, but not exclusively, the invention concerns a helmet mounted augmented reality system.

BACKGROUND

Augmented reality (AR) is a technological field which provides an interactive experience of a real-world environment where objects viewed within the real world are enhanced by computer generated information.

Helmet mounted AR systems typically comprise a mounted viewing device, such as a camera with incorporated compasses and an AR engine, a connection to external source of data and a battery (either built into the mounted viewing device or separately located) to power the mounted viewing device. The AR engine is typically configured to determine the directional orientation of the mounted viewing device and in some cases the position of a user using global positioning system (GPS) data. The mounted viewing device is operable to output AR data overlaying the objects viewed in the real world through the viewing device.

The directional orientation of the viewing device represents the direction in which a user is pointing their helmet. This is typically determined using a 9-axis compass. In a 9-axis compass, a 3-axis magnetometer is used to detect magnetic north and the other 6 axis, typically comprising 3 accelerometers and 3 gyroscopic meters, are used to compensate for tilt in order to present magnetic north in the level plane of the observer. As the compass is inside the display device, its pointing vector (relative to magnetic north) can be tracked by the compass and the orientation information relayed to the AR engine to generate and overlay suitable AR information to coincide with the image of the real world.

As issue associated with helmet mounted AR systems is that they can be front heavy, with the AR engine typically being built into the viewing apparatus. This can provide an excess strain on the neck of users. One solution to the weight balance issue is to place the AR engine in a separate battery pack on the rear of the helmet. A data connection between the viewing device and the battery pack enables compass and visual data from the viewing device to be supplied to the battery pack for processing by the AR engine. Subsequently, AR data can be supplied back to the viewing device for output.

In order to provide reasonable alignment of the AR information, orientation information updates from the compass need to be available to the AR engine at a sufficient rate for overlaid AR information to match video frame rates, typically 50 Hz or higher. This requirement constrains AR system design and presents a problem of getting sufficient data from the compass to the AR engine alongside the transmission of video feed, GPS and AR information for video feed overlay.

The present invention aims to provide a helmet mounted AR apparatus and system which at least partially overcome or alleviates the above problems.

SUMMARY OF THE DISCLOSURE

According to a first aspect of the invention there is provided a user wearable augmented reality (AR) system comprising: a viewing device operable to output AR data; and a power pack linked to the viewing device, wherein the power pack comprises: a power supply; a primary orientation sensor operable to measure the power pack orientation; an orientation engine operable in response to polling the primary orientation sensor to calculate viewing device orientation on the basis of a relationship between the power pack orientation and the viewing device orientation; and an AR engine, operable to generate AR data for output by the viewing device, where the AR data varies in response to the calculated viewing device orientation and wherein the orientation engine is operable to determine or update the relationship between the power pack orientation and the viewing device orientation by polling a secondary orientation sensor in the viewing device.

As both the primary orientation sensor and AR engine are located in the power pack, the present invention provides multiple benefits. Firstly, weight distribution of components may be shifted away from the viewing device at the front of the helmet (where they would conventionally be located) toward the back of the helmet, thereby reducing strain on the neck of a user and improving user comfort. Secondly, this enables a reduction in the required data transfer between the viewing device and the AR engine whilst still enabling rapid polling of the primary orientation engine to reduce latency. This enables the augmented reality engine to refresh the location of overlayed augmented reality data at a greater rate than video frame, thereby improving user experience. In particular, maximising the update rate and minimising latency is important to reduce the potential for a user to experience motion sickness effects Furthermore, calculating the AR orientation in the power pack of the helmet also means that the viewing device of the system can be a simpler and more readily interchangeable component.

The viewing device may comprise an eyepiece, adapted for directing viewing device output to the eye of a user. The viewing device may comprise an external aperture for collecting incident light and a lensing arrangement operable to direct and focus said incident light at said eyepiece. The lensing arrangement may include a filter. The viewing device may additionally or alternatively comprise a display unit operable to output light to the eyepiece. The display unit may be operable to output AR data.

In some embodiments, the viewing device may comprise a light sensing device operable to capture incident light. In such embodiments, the display unit may be operable to output data captured by the light sensing device. The light sensing device may be sensitive to light at infrared, visible or ultraviolet wavelengths as desired or as appropriate. The light sensing device may be a camera, an image intensifier or the like. The camera may be operable to capture still or moving images.

The primary and/or secondary orientation sensors may comprise a compass. In some embodiments, the compass may comprise a three-axis magnetometer. The primary and/or secondary orientation sensors may comprise a three-axis accelerometer. The primary and/or secondary orientation sensors may comprise a three-axis gyrometer. In a preferred embodiment, the primary and/or secondary orientation sensors comprises a magnetometer, accelerometer and gyrometer. The primary and/or secondary orientation sensors may comprise an Inertial Measurement Unit (IMU). Typically, the primary and secondary orientation sensors may be of the same model or closely related models. Using the same model or closely related models may offer improved interoperability between the primary and secondary orientation sensors.

The system may additionally comprise a location sensor. In such embodiments, the AR engine may be operable to generate the AR data in response to the location sensor. The location sensor may be provided in or linked to the power pack. The location sensor may be operable to determine the location of the system. In some embodiments, the location sensor may be operable to determine system location by receiving external signals. The location sensors may interact with Global Navigation Satellite Systems (GNSS), including but not limited to the Global Positioning System (GPS), Beidou, the Global Navigation Satellite System (GLONASS) and Galileo networks.

The AR engine and the viewing device may be connected via a wired or wireless link, as appropriate. In embodiments where a wired connection is utilised, the wired connection may be Universal Serial Bus (USB) or part of Generic Soldier Architecture (GSA).

The system may comprise a wearable item to which the viewing device and power pack are mounted. The mounting may be releasable. The wearable item may comprise headgear such as a helmet, hat, band or the like. In such cases, the power pack may be mounted to the rear of the headgear. The viewing device may be mounted to the front of the headgear.

The viewing device may be mounted in a set position. Alternatively, the viewing device may be movable between a stowed position and a deployed position. In the deployed position, the eyepiece may be aligned with a user's eye. The power supply may comprise one or more batteries or other suitable energy storage units. In some embodiments, the power supply may additionally or alternatively comprise energy scavenging means. Suitable energy scavenging means include but are not limited to photovoltaic cells, piezo-electric devices, RF induction devices or the like.

The power pack may comprise a communication unit. The communication unit may be operable to facilitate data exchange with one or more additional devices. The data exchange may be carried out via a wired or wireless link as desired or as appropriate. In embodiments where a wired link is utilised, the wired link may be Universal Serial Bus (USB) or part of Generic Soldier Architecture (GSA). The one or more additional devices may comprise an external hub or interface. Additionally or alternatively, the one or more additional devices may comprise user worn or carried infrastructure. The infrastructure on the user may provide data. The infrastructure on the user may provide power. The infrastructure on the user may conform with Generic Soldier Architecture (GSA). The GSA may be Defence Standard (DEF STAN) 23-012.

In such embodiments, the AR engine may be operable to generate AR data in response to said external data or including said external data. Where required, the AR engine may be provided with a data store operable to store said external data. The external data may comprise images or data for output by the AR engine. In some embodiments, this may include data relating to the location of other users of such systems or the like.

The additional devices may be of any suitable type. In one embodiment, the additional device may comprise an Android Team Awareness Kit (ATAK) unit or the like. The additional device may be also be user mounted, for instance in a back mounted, arm mounted or waist mounted pack. Additionally or alternatively, the additional device may be provided at a remote location.

The AR data may comprise text, numbers, symbols, images or combinations thereof. In some embodiments, the AR data may comprise highlighted, abstracted or enhanced images or part images.

The relationship between the orientation of the power pack and the orientation of the viewing device may be determined by any suitable calibration process. In some embodiments, calibration may be achieved by analysis of the relative or absolute orientations of the primary and/or secondary orientation sensors by comparing magnetic, gyroscopic or accelerometer data.

The relationship may be fixed following calibration. Additionally or alternatively, the orientation engine may be operable to update the relationship periodically or continuously following calibration. This may be achieved by interpolation or extrapolation from the current and/or past output of the primary orientation sensor. The use of interpolation and/or extrapolation can help maintain accuracy and minimise latency. Such interpolation or extrapolation may be based on a Kalman filter or similar physical filter. In some embodiments, the interpolation or extrapolation may be carried out by a suitable neural network in communication with the orientation engine.

The orientation engine may be operable to initiate calibration upon start up and/or after a predetermined interval. Additionally or alternatively, the orientation engine may be operable to initiate calibration in response to user input. In further embodiments, the orientation engine may be operable to initiate calibration in response to a calibration check and/or in response to a calibration confidence estimate.

In a preferred embodiment, the orientation engine is operable to periodically poll the secondary orientation sensor in order to perform a calibration check and/or to update a calibration confidence estimate. In such embodiments, polls of the secondary orientation sensor may be less frequent than polls of the primary orientation sensor. Typically, whilst the primary orientation sensor may be polled at, say, 50 Hz, the secondary orientation sensor may be polled at, say 30 Hz or say in the approximate range 30 HZ to 1 Hz. The upper bounds of the primary and secondary polling rates could rise to a much higher rate such as 100 Hz or even 180 Hz (as non-limiting examples) if technologies adapt to such standards. The polling frequency of the secondary sensor may be varied in response to the calibration confidence estimate. For example, polling frequency may be reduced if the calibration confidence is high and may be increased where the calibration confidence is low. In preferred embodiments, the polling frequency is limited to the lowest rate possible to improve power and processing efficiency of both the viewing device and the power pack.

The calibration check may comprise comparing the viewing device orientation measured by the secondary orientation sensor with the calculated viewing device orientation. This can enable the orientation engine to verify the relationship between power pack orientation and the viewing device orientation. In the event that the comparison differs from a pre-set or calibrated relationship by greater than a threshold value, calibration may be initiated.

The calibration confidence estimate may be calculated by the primary orientation sensor using a model of calibration confidence. The model of calibration confidence may include input parameters derived from any one or more of user movement, time elapsed since previous calibration or calibration check, primary orientation sensor output, secondary orientation sensor output, difference between secondary orientation sensor output and calculated orientation, or the like. The calibration confidence estimate may be based on comparison with threshold values or threshold variations of any one input parameter or upon a summation of threshold values or threshold variations of any two or more input parameters.

According to a second aspect of the invention there is provided a power pack for a user wearable augmented reality (AR) system of the type having a viewing device, the viewing device being operable to output AR data; and a power pack linked to the viewing device, the power pack comprising: a power supply; a primary orientation sensor operable to measure the power pack orientation; an orientation engine operable in response to the primary orientation sensor to calculate a viewing device orientation on the basis of a relationship between the power pack orientation and the viewing device orientation; and an AR engine, operable to generate AR data for output by the viewing device, where the AR data varies in response to the calculated viewing device orientation and wherein the orientation engine is operable to determine or update the relationship between the power pack orientation and the viewing device orientation by polling a secondary orientation sensor in the viewing device.

The power pack of the second aspect of the present invention may incorporate any or all features of the user wearable augmented reality (AR) system of the first aspect of the present invention, as desired or as appropriate.

According to a third aspect of the invention there is provided a method of operating a user wearable augmented reality (AR) system of the type having a viewing device operable to output AR data; and a power pack linked to the viewing device, the method comprising the steps of: measuring the power pack orientation using a primary orientation sensor provided in the power pack; calculating a viewing device orientation on the basis of a relationship between the power pack orientation and the viewing device orientation; generating AR data for output by the viewing device, the AR data being varied in response to the calculated viewing device orientation; and determining or updating the relationship between the power pack orientation and the viewing device orientation by polling a secondary orientation sensor in the viewing device.

The method of the third aspect of the present invention may incorporate any or all features of the user wearable augmented reality (AR) system of the first aspect of the present invention or the power pack of the second aspect of the present invention, as desired or as appropriate.

BRIEF DESCRIPTION OF THE DRAWINGS

For the purpose of illustrating the disclosure, the drawings show aspects of one or more embodiments of the disclosure. However, it should be understood that the present disclosure is not limited to the precise arrangements and instrumentalities shown in the drawings, wherein.

DETAILED DESCRIPTION

Figure 1:
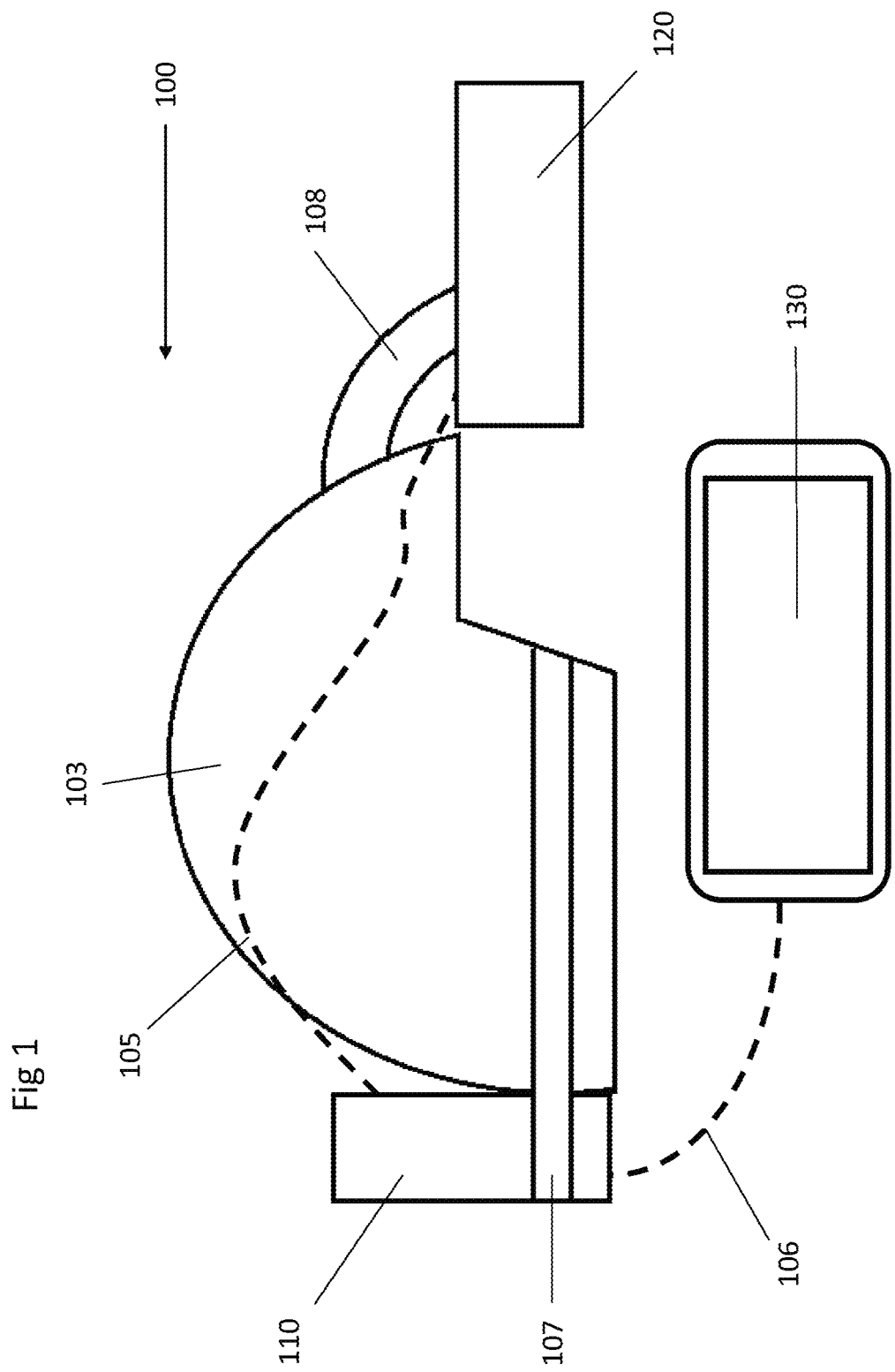
FIG. 1 is an illustration of an augmented reality (AR) system according to the present invention.

Turning now to FIG. 1, a user wearable augmented reality (AR) system 100 according to the present invention is illustrated schematically. The AR system 100 comprises: a power pack 110 and a viewing device 120 linked by power and data connection 105.

In this example, the AR system 100 is provided on a helmet 103, power pack 110 being mounted in position by attachment strap 107 at the rear of the helmet 103 and viewing device 120 being mounted on bracket 108 at the front of the helmet 103. Typically, the system 100 is designed such that the viewing device 120 may be easily interchanged at attachment bracket 108 for different applications. The skilled man will appreciate that the AR system 100 could be fitted to other user wearable headgear and/or using alternative mounting elements in other implementations.

As shown in the example of FIG. 1, an optional additional device 130 is connected to the AR system 100 via data connection 106. The additional device 130 can act as an external data source for AR data. The additional device 130 being an external data source is not mounted to the helmet 103. In embodiments which are not depicted in the figures, the additional device 130 could be mounted on a belt, backpack or the like. The example shown in the figures show only a single additional device, the skilled person would appreciate that further additional devices may be utilised if required or desired. Typically, any such devices would conform to the standards of which may conform with Generic Soldier Architecture (GSA). The GSA may be Defence Standard (DEF STAN) 23-012.

Figure 3:
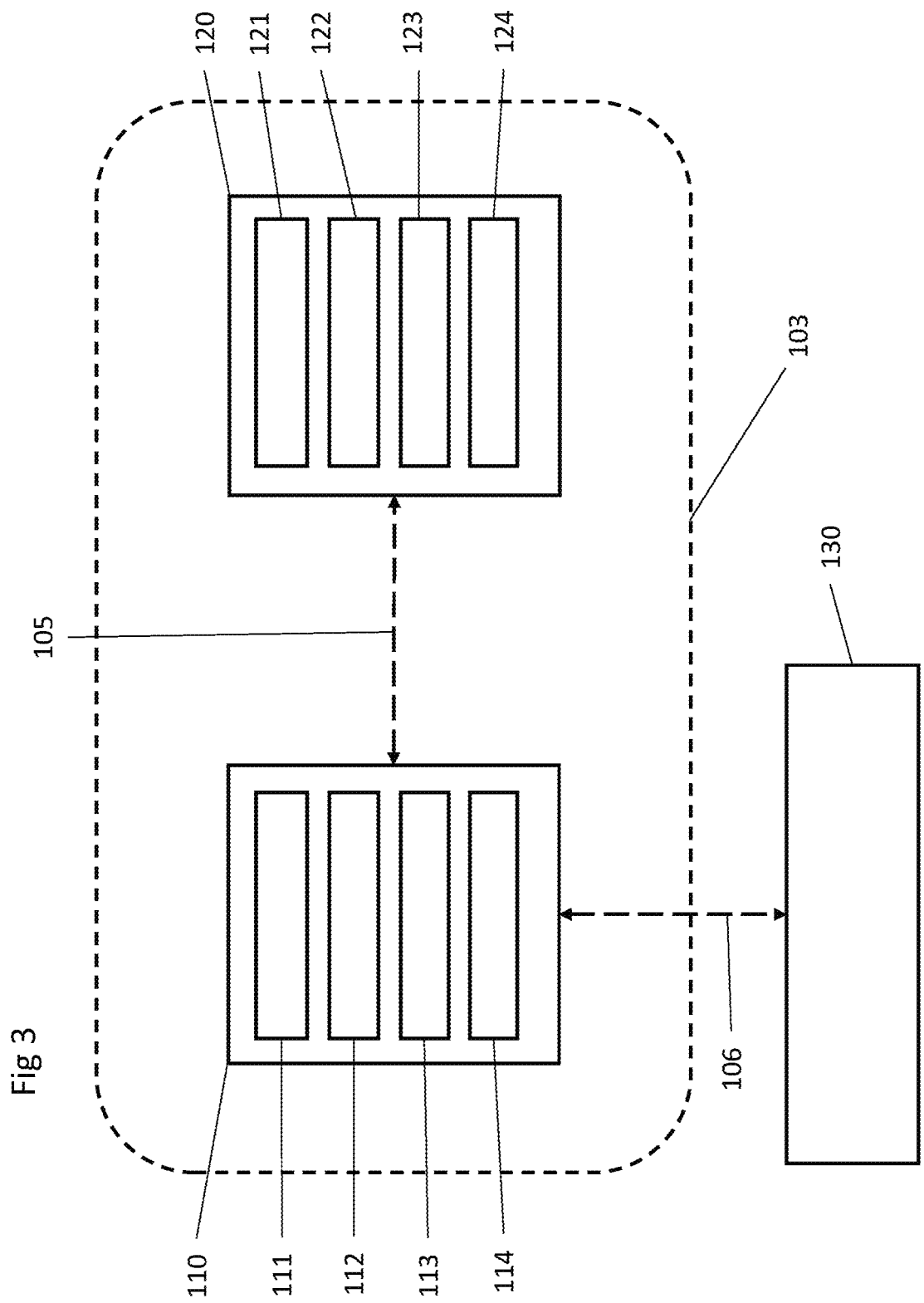
FIG. 3 is a schematic block diagram of the AR system of FIG. 1.

As is discussed in more detail in relation to FIG. 3, the power pack 110 comprises a power supply 111, a primary orientation sensor 112, an orientation engine 113, operable in response to the orientation sensor 112 to calculate viewing device 120 orientation and an AR engine operable to generate AR data in response to the calculate viewing device 120 orientation. The viewing device 120 comprises an eyepiece 121 through which a user can view the AR data and a secondary orientation sensor 124. Typically, the AR data can be overlaid over images generated from other light incident upon the viewing device 120.

In use, a user would wear the helmet 103 and look through the viewing device 120 to see an AR enhanced view. An example of such a viewing device output 201 is illustrated schematically in FIG. 2.

Figure 2:
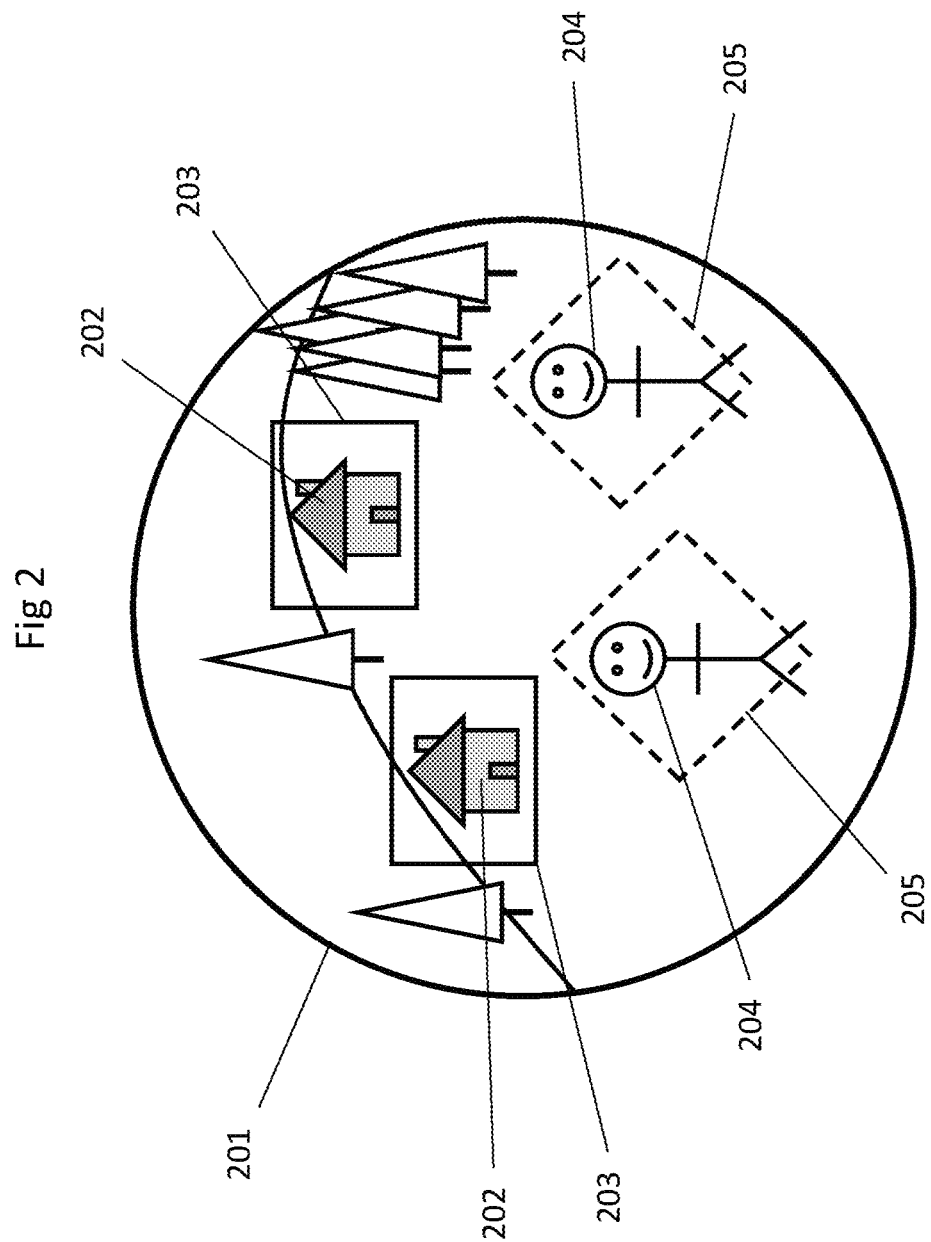
FIG. 2 is an illustration of a user perspective when looking at or through the viewing device of an AR system.

In the example of FIG. 2, the viewing device output 201 comprises real objects as seen in a live scene through the viewing device 120. This may include buildings 202, pedestrians or people 204, objects, landmarks such as trees, vehicles (not shown) and other points of interest. During operation of the AR system, AR data 203, 205 is superimposed, overlayed over, projected onto or otherwise incorporated into the live scene of the viewing device output 201 to highlight and indicate specific points of interest. The position of the AR data 203, 205 within the live scene 201 updates over time. The position of the AR data 203, 205 within the live scene 201 updates according to the position and orientation of the viewing device 120. The AR data also updates according to movement of the indicated points of interest 204 within the live scene (such as when an indicated vehicle or person 204 moves). The AR data 203, 205 may comprise square outlines 203, diamond outlines 205, symbols, points, live images, text, numbers, symbols, images or combinations thereof. The AR data 203, 205 may comprise NATO Joint Military Symbology. In some embodiments, the AR data may comprise highlighted, abstracted or enhanced images or part images.

In order to provide a high-quality user experience, the position of AR data needs to be updated/refreshed at video frame rates, typically up to (but not limited to) 60 frames per second for high-definition video frame rates. As such an AR engine which generates the AR data 203, 205 needs to receive information relating to the orientation and position of the viewing device 120 at equivalent or faster video frame rates, such that it may also generate updated AR data at video frame rates.

Turning now to FIG. 3, a detailed block diagram of the AR system is presented. A power pack 110 and viewing device 120 are attached to a helmet 103 and transfer information and power via a connection 105. The power pack 110 may also transfer information with an external device 104 via a different connection 106. The connection 106 between the power pack 110 and the external device 104 may be wired or wireless. The power pack 110 may also transfer power to either or both of the viewing device 120 and the external device 104 using the connections 105, 106, or via alternate means. The viewing device 120 and the external device 104 may alternatively or additionally have their own power supplies.

Turning to the power pack 110, the power supply 111 is typically a battery, which may be rechargeable. Optionally, the power supply may additionally include energy scavenging devices such as photovoltaic cells, piezoelectric devices or the like to help maintain battery charge. The primary orientation sensor 112 typically comprises a three-axis magnetometer, a three-axis accelerometer and a three-axis gyrometer. The orientation engine 113 is operable in response to the primary orientation sensor 112 to calculate the viewing device 120 orientation on the basis of a relationship between the power pack 110 orientation and the viewing device 120 orientation, as will be described in more detail in respect of FIG. 4 below. The AR engine 114 is operable to generate AR data 203, 205 for output by the viewing device 120, where the AR data varies in response to the calculated viewing device 120 orientation. Optionally, the power pack 110 may additionally comprise a location sensor such as a unit (not shown).

The viewing device 120 comprises an eyepiece 121 which is adapted for directing viewing device output 201 to the eye of a user. The viewing device 120 comprises an external aperture and/or light sensing device 122 to collect and/or capture incident light for viewing at the eyepiece 121 of the viewing device. Where the viewing device comprises an aperture, this is typically provided with a lensing arrangement suitable for focussing incident light either on the eyepiece 121 or on the light sensing device 122. The light sensing 122 device may be sensitive to light at infrared, visible or ultraviolet wavelengths as desired or as appropriate. Typically, the viewing device 120 comprises a display unit 123 or other light output device aligned with eyepiece 121. The display unit 123 is operable to receive and output the AR data from the AR engine 114. This can allow AR data to be overlaid on focussed incident light. Where appropriate, the display unt 123 may be additionally or alternatively operable to output data resulting from incident light captured by light sensing device 122. This can be in the form of a combined image including AR data overlaid over a captured image.

The viewing device 120 also comprises a secondary orientation sensor 124. The secondary orientation sensor 124 of the viewing device 120 is typically a compass comprising a three-axis magnetometer, a three-axis accelerometer and a three-axis gyrometer, however, in certain embodiments the three-axis magnetometer is not a necessity as readings from the orientation sensor 112 of the power pack may be substituted.

Optionally, the AR system 100 also comprises a location sensor (not shown) such as a Global Navigation Satellite Systems (GNSS) unit. In such cases the AR data can also be varied in response to the location sensor output. The location sensor may be provided in the power pack 110 or in additional device 130 and linked to the power pack 110 and is configured to provide output to the AR engine 114 of the power pack 110. The output of the location sensor informs the AR engine 114 of the updated user location so that the AR engine 114 may generate AR data from a correct locational perspective.

The additional device 130 acts as an external data source. The additional device 130 is capable of receiving and transmitting data from sources which are external to the AR system 100. The additional device 130 need not be mounted to the helmet 103, but is typically mounted elsewhere on the user's body (such as a backpack or belt) and shares a wired or wireless connection to the power pack 110. In the preferred embodiment, the additional device 130 comprises an Android Team Awareness Kit (ATAK) unit. The ATAK unit of the additional device 130 receives external data and transmits the external data to the AR engine 114 for use when generating the AR data 203, 205 which will be viewed through the eyepiece 121. The external data may comprise images or data for output by the AR engine 114. In some embodiments, this may include data relating to the location of other users of such systems or the like. Where required, the AR engine 114 comprises a data store (not shown) operable to store said external data.

Figure 4:
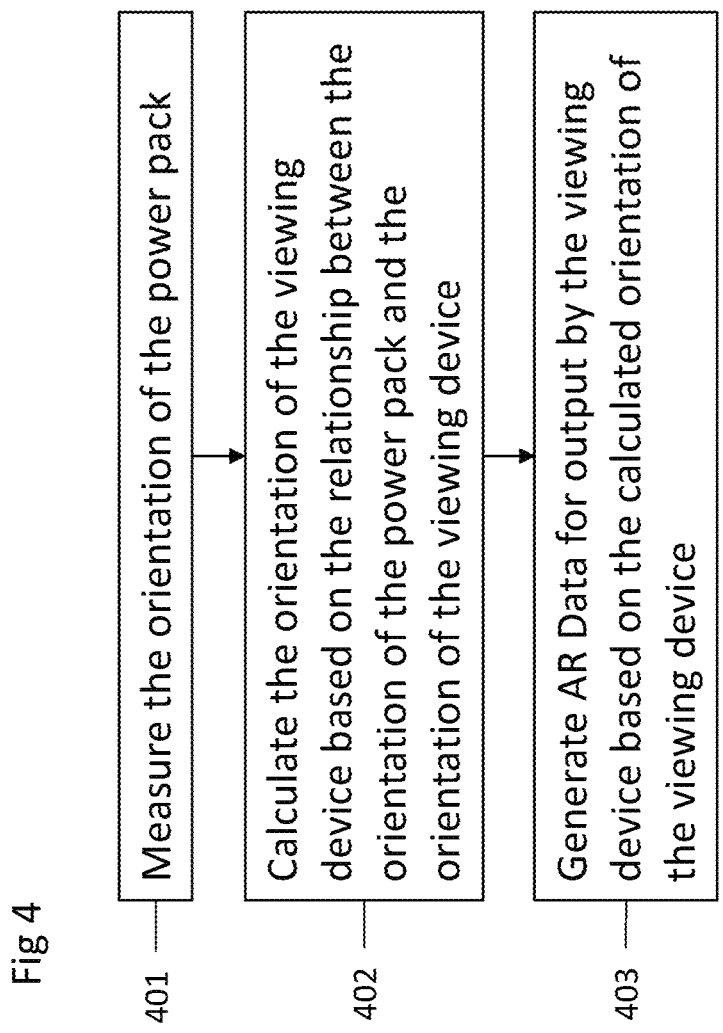
FIG. 4 is a flow diagram illustrating operation of the AR system of FIG. 1.

FIG. 4 shows a simplified flow diagram of the AR system 100 during operation.

In a first step 401, the orientation engine 113 measures the orientation of the power pack 110, this is measured based on output which is received at the orientation engine 113 from the primary orientation sensor 112.

In step 402, the orientation engine 113 calculates the orientation of the viewing device 120 based on a relationship between the orientation of the power pack 110 and the orientation of the viewing device 120. This may involve applying a correction factor to the measured orientation of the power pack 110, and the correction factor may be stored in the orientation engine 113.

In step 403, the AR engine 114 generates AR data 203, 205 for output by the viewing device 120. The generated output data 203, 205 is based on the calculated orientation of the viewing device 120. The generated output 203, 205 is also based on the user location if a location sensor is provided.

In further steps (not shown) the AR engine 114 transmits the generated AR data 203, 205 to the viewing device 120. The display unit 123 outputs the generated AR data 203, 205 in addition to any incident light which has been collected and/or captured by external aperture and/or light sensing device 122.

The relationship between the orientation of the power pack 110 and the orientation of the viewing device 120 may be determined by any suitable calibration process. In order for the AR system 100 to perform calibration, the viewing device 120 requires the secondary orientation sensor 124.

Figure 5:
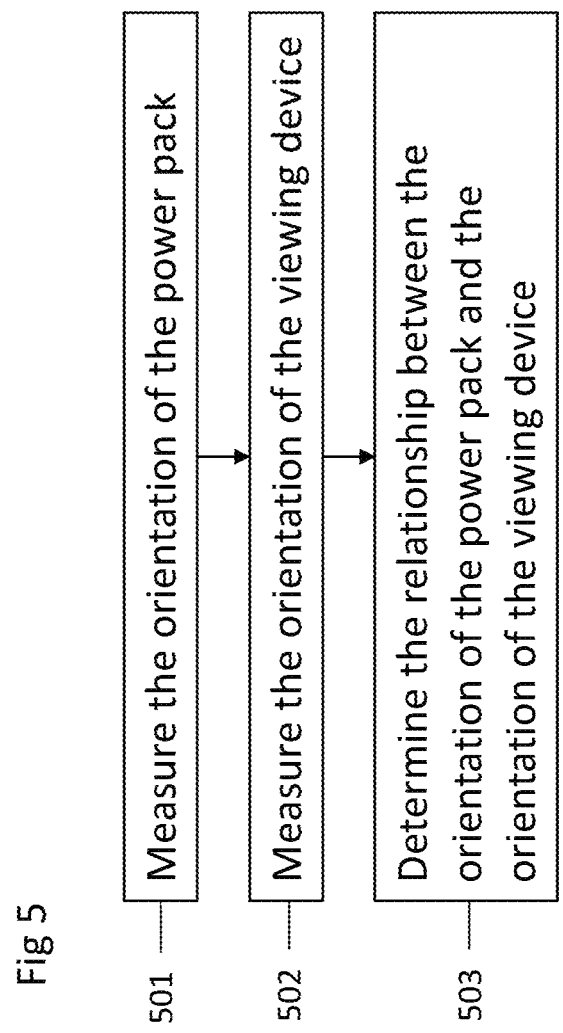
FIG. 5 is a flow diagram illustrating calibration of a viewing device orientation of the AR system of FIG. 1.

FIG. 5 shows the steps required to calibrate the relationship between the orientation of the power pack 110 and the orientation of the viewing device 120.

In a first step 501, the orientation engine 113 measures the orientation of the power pack 110, this is measured based on output which is received at the orientation engine 113 from the primary orientation sensor 112.

In a second step 502, the orientation engine 113 measures the orientation of the viewing device 120, this is measured based on output which is received at the orientation engine 113 from the secondary orientation sensor 124 of the viewing device 120.

In a third step 503, the orientation engine 113 determines (or updates) the relationship between the orientation of the power pack and the orientation of the viewing device 120.

The relationship may be updated continuously, or at intervals and the calibration may be updated if a model of orientation begins to drift, or the relationship may be updated periodically after some amount of time or motion has been accumulated. The relationship may be fixed following calibration.

Additionally or alternatively, the orientation engine 113 may be operable to update the relationship periodically or continuously following calibration. This may be achieved by interpolation or extrapolation from the current and/or past output of the primary orientation sensor 112. The use of interpolation and/or extrapolation can help maintain accuracy and minimise latency. Such interpolation or extrapolation may be based on a Kalman filter or similar physical filter. In some embodiments, the interpolation or extrapolation may be carried out by a suitable neural network (not shown) in communication with the orientation engine 113.

The calibration steps of FIG. 5 may run in parallel to the operational steps of FIG. 4, or may take place before the operational steps of FIG. 4 occur.

The orientation engine 113 may be operable to initiate calibration upon start up and/or after a predetermined interval. Additionally or alternatively, the orientation engine may be operable to initiate calibration in response to user input.

In a preferred embodiment, the orientation engine 113 is operable to periodically poll the secondary orientation sensor 124 in order to perform a calibration check and/or to update a calibration confidence estimate. In such embodiments, polls of the secondary orientation sensor 124 may be less frequent than polls of the primary orientation sensor 112. The polling frequency of the secondary sensor 124 may be varied in response to the calibration confidence estimate. For example, polling frequency may be reduced if the calibration confidence is high and may be increased where the calibration confidence is low. In preferred embodiments, the polling frequency is limited to the lowest rate possible to improve power and processing efficiency of both the viewing device and the power pack.

Figure 6:
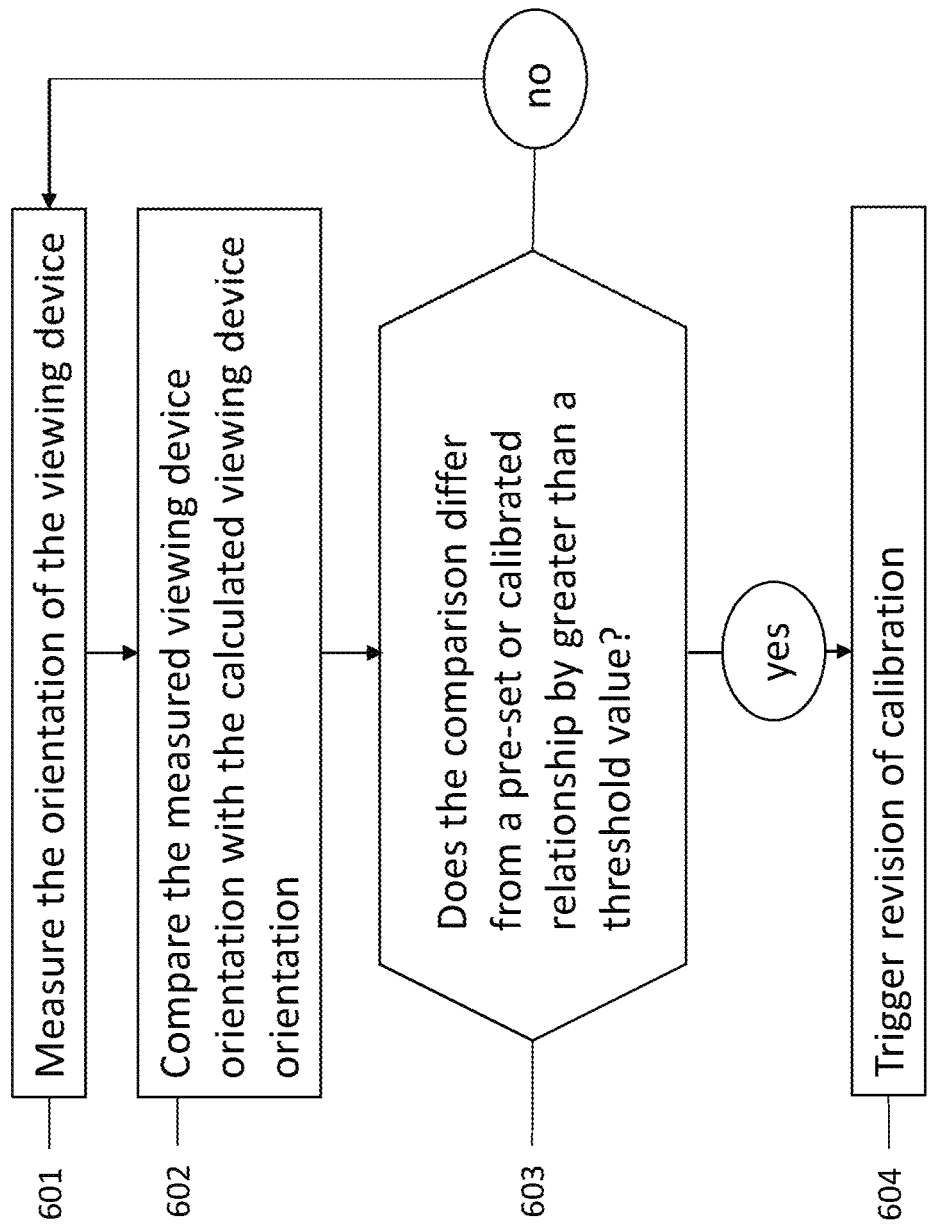
FIG. 6 is a flow diagram illustrating periodic updating of calibration of a viewing device orientation of the AR system of FIG. 1.

The calibration check is depicted in FIG. 6 may comprise a step 601 of measuring the orientation of the viewing device 120, a step 602 of comparing the viewing device 120 orientation measured by the secondary orientation sensor 124 with the calculated viewing device orientation. This can enable the orientation engine 113 to verify the relationship between power pack 110 orientation and the viewing device 120 orientation. In the event that the comparison differs from a pre-set or calibrated relationship by greater than a threshold value in check 603, revision of calibration may be initiated as per step 604.

The calibration confidence estimate may be calculated by the primary orientation sensor using a model of calibration confidence. The model of calibration confidence may include input parameters derived from any one or more of user movement, time elapsed since previous calibration or calibration check, primary orientation sensor output, secondary orientation sensor output, difference between secondary orientation sensor output and calculated orientation, or the like. The calibration confidence estimate may be based on comparison with threshold values or threshold variations of any one input parameter or upon a summation of threshold values or threshold variations of any two or more input parameters. Where appropriate, the calibration confidence estimate may use movement data from the GNSS sensor to influence the model of calibration confidence.

A revision of the calibration may also or alternatively be triggered in response to an external signal, for example by a team leader triggering revision of calibration for team members at the same time using wireless communication or via ATAK as examples, thereby ensuring that everyone in the team will have updated calibration settings.

The one or more embodiments are described above by way of example only. Many variations are possible without departing from the scope of the invention as defined in the appended claims.

The foregoing has been a detailed description of illustrative embodiments of the disclosure. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present disclosure. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this disclosure.

Exemplary embodiments have been disclosed above and illustrated in the accompanying drawings. It will be understood by those skilled in the art that various changes, omissions and additions may be made to that which is specifically disclosed herein without departing from the spirit and scope of the present disclosure.

What is claimed is:

1. A user wearable augmented reality (AR) system, comprising:
    a viewing device operable to output AR data to a user, the viewing device comprising a secondary orientation sensor; and a power pack linked to the viewing device, wherein the power pack comprises:
  a power supply;
  a primary orientation sensor operable to measure a power pack orientation;
  an orientation engine, operable in response to polling the primary orientation sensor at a first rate so as to calculate a viewing device orientation on a basis of a relationship between the power pack orientation and the viewing device orientation; and
  an AR engine, operable to generate AR data for output by the viewing device, wherein the AR data varies in response to the calculated viewing device orientation, and wherein the orientation engine is operable to determine or update the relationship between the power pack orientation and the viewing device orientation by polling the secondary orientation sensor in the viewing device at a second rate that is lower than the first rate.

2. The user wearable AR system according to claim 1, wherein the viewing device comprises an eyepiece adapted for directing viewing device output to the eye of a user.

3. The user wearable AR system according to claim 2, wherein the viewing device comprises at least one of an external aperture and a display unit operable to output light to the eyepiece.

4. The user wearable AR system according to claim 1, wherein the viewing device comprises a light sensing device operable to capture incident light, wherein the light sensing device is sensitive to light at infrared, visible or ultraviolet wavelengths.

5. The user wearable AR system according to claim 1, wherein at least one of the primary and secondary orientation sensors comprises an Inertial Measurement Unit (IMU).

6. The user wearable AR system according to claim 1, wherein at least one of the primary and secondary orientation sensors comprise a compass, an accelerometer and a gyrometer.

7. The user wearable AR system according to claim 1, further comprising a location sensor, and wherein the AR engine is operable to generate the AR data in response to output from the location sensor.

8. The user wearable AR system according to claim 1, further comprising a wearable item to which the viewing device and power pack are mounted, wherein the wearable item has a rear and a front, and the power pack is mounted to the rear of the wearable item and the viewing device is mounted to the front of the wearable item.

9. The user wearable AR system according to claim 1, wherein the power pack comprises a communication unit, the communication unit being operable to facilitate exchange of external data with one or more additional devices.

10. The user wearable AR system according to claim 9, wherein the AR engine is operable to generate AR data in response to the external data or including the external data, and wherein the AR engine is provided with a data store operable to store the external data.

11. The user wearable AR system according to claim 9, wherein the one or more additional devices comprise an Android Team Awareness Kit (ATAK) unit.

12. The user wearable AR system according to claim 1, wherein the AR data comprises text, numbers, symbols, images or combinations thereof.

13. The user wearable AR system according to claim 1, wherein the relationship between the power pack orientation and the viewing device orientation is determined by any suitable calibration process.

14. The user wearable AR system according to claim 13, wherein calibration of the calibration process is achieved by analysis of relative or absolute orientations of at least one of the primary and secondary orientation sensors by comparing magnetic, gyroscopic, or accelerometer data.

15. The user wearable AR system according to claim 13, wherein the relationship is fixed following the calibration.

16. The user wearable AR system according to claim 13, wherein the orientation engine is operable to update the relationship periodically or continuously following the calibration.

17. The user wearable AR system according to claim 16, wherein the relationship is continuously or periodically updated based on interpolation or extrapolation from at least one of current and past output of the primary orientation sensor.

18. The user wearable AR system according to claim 13, wherein the orientation engine is operable to initiate the calibration either upon start up or after a predetermined interval, or both upon startup and after a predetermined interval.

19. The user wearable AR system according to claim 13, wherein the orientation engine is operable to initiate the calibration in response to user input.

20. The user wearable AR system according to claim 1, wherein the orientation engine is operable to periodically poll the secondary orientation sensor in order to perform at least one of a calibration check and an update of a calibration confidence estimate.

21. The user wearable AR system according to claim 20, wherein the calibration check comprises comparing the viewing device orientation measured by the secondary orientation sensor with the calculated viewing device orientation.

22. The user wearable AR system according to claim 20, wherein the polling frequency of the secondary sensor is varied in response to the calibration confidence estimate.

23. A power pack for a user wearable augmented reality (AR) system of a type having a viewing device, the viewing device being operable to output AR data and the power pack linked to the viewing device, wherein the viewing device has a secondary sensor, the power pack comprising:
  a power supply;
  a primary orientation sensor operable to measure a power pack orientation;
  an orientation engine operable in response to the primary orientation sensor to calculate a viewing device orientation at a first rate and on a basis of a relationship between the power pack orientation and the viewing device orientation; and
  an AR engine, operable to generate AR data for output by the viewing device, where the AR data varies in response to the calculated viewing device orientation and wherein the orientation engine is operable to determine or update the relationship between the power pack orientation and the viewing device orientation by polling the secondary orientation sensor in the viewing device at a second rate that is lower than the first rate.

24. A method of operating a user wearable augmented reality (AR) system of the type having a viewing device operable to output AR data and having a power pack linked to the viewing device, the method comprising:
  measuring a power pack orientation;

calculating a viewing device orientation at a first rate and on the basis of a relationship between the power pack orientation and a viewing device orientation;

generating AR data for output by the viewing device, the AR data being varied in response to the calculated viewing device orientation; and determining or updating the relationship between the power pack orientation and the viewing device orientation by polling a secondary orientation sensor in the viewing device at a second rate that is lower than the first rate.

* * * * *